US011928959B2

(12) United States Patent
Higuchi et al.

(10) Patent No.: US 11,928,959 B2
(45) Date of Patent: Mar. 12, 2024

(54) ON-DEMAND FORMATION OF STATIONARY VEHICULAR MICRO CLOUDS

(71) Applicant: TOYOTA JIDOSHA KABUSHIKI KAISHA, Toyota (JP)

(72) Inventors: Takamasa Higuchi, Mountain View, CA (US); Onur Altintas, Mountain View, CA (US); Kentaro Oguchi, Mountain View, CA (US)

( * ) Notice: Subject to any disclaimer, the term of this patent is extended or adjusted under 35 U.S.C. 154(b) by 351 days.

(21) Appl. No.: 16/246,334

(22) Filed: Jan. 11, 2019

(65) Prior Publication Data
US 2020/0226921 A1    Jul. 16, 2020

(51) Int. Cl.
*G08G 1/01* (2006.01)
*B60W 40/04* (2006.01)
*G06F 16/29* (2019.01)
*H04W 4/40* (2018.01)

(52) U.S. Cl.
CPC ........... *G08G 1/0141* (2013.01); *B60W 40/04* (2013.01); *G06F 16/29* (2019.01); *G08G 1/0112* (2013.01); *H04W 4/40* (2018.02); *B60W 2554/00* (2020.02); *B60W 2756/10* (2020.02)

(58) Field of Classification Search
None
See application file for complete search history.

(56) References Cited

U.S. PATENT DOCUMENTS

2017/0098373 A1* 4/2017 Filley ............... H04W 4/90
2018/0225970 A1* 8/2018 Mitra ............... G08G 1/096791
2019/0014446 A1* 1/2019 Gade ............... G08G 1/0133
2019/0349719 A1* 11/2019 Pattan ............... H04W 4/08
2020/0079387 A1* 3/2020 A G ............... B60W 40/09

OTHER PUBLICATIONS

Higuchi, et al., "How to Keep a Vehicular Micro Cloud Intact," 2018 IEEE 87th Vehicular Technology Conference, Jun. 3, 2018, 5 pages.*
Higuci et al., How to Keep a Vehicular Micro Cloud Intact, 2018 IEEE 87th Vehicular Technology Conference, Jun. 3, 2018 5 pages (Year: 2018).*
Higuchi, et al., "How to Keep a Vehicular Micro Cloud Intact," 2018 IEEE 87th Vehicular technology Conference, Jun. 3, 2018 (Year: 2018).*
EPO, Extended European Search Report for European Patent Application No. 20150155.8, dated Apr. 21, 2020, 9 pages.

* cited by examiner

*Primary Examiner* — Aniss Chad
*Assistant Examiner* — Mahmoud M Kazimi
(74) *Attorney, Agent, or Firm* — Burbage Law, P.C.; Jon-Michael Burbage

(57) ABSTRACT

The disclosure includes embodiments for forming an on-demand stationary vehicular micro cloud. In some embodiments, a method for a connected vehicle includes receiving event data that describes a set of events configured for triggering a creation of the on-demand stationary vehicular micro cloud. The method includes receiving sensor data that describes a roadway environment. The method includes detecting, based at least in part on the sensor data, an occurrence of at least one event included in the set of events. The method includes modifying an operation of a communication unit of the connected vehicle to initiate the creation of the on-demand stationary vehicular micro cloud to address the occurrence of the at least one event.

20 Claims, 9 Drawing Sheets

ON-DEMAND FORMATION OF STATIONARY VEHICULAR MICRO CLOUDS

BACKGROUND

The specification relates to forming on-demand stationary vehicular micro clouds.

Cloud computing aids in emerging services for connected and automated driving vehicles, since the vehicles are expected to exchange an increasing amount of data content with remote cloud servers (e.g., by way of cellular networks). Examples of such data content include a three-dimensional road map for automated driving, content for infotainment services, etc. An increasing amount of network traffic between the vehicles and cloud servers may cause a significant load on radio access networks and underlying backbone networks.

Distributed data storage by a cluster of connected vehicles (i.e., a "vehicular micro cloud") is a promising solution to cope with the increasing network traffic generated for and by connected vehicles. Vehicles collaboratively store (or cache) data content in their onboard data storage devices and share the data content over vehicle-to-vehicle (V2V) networks as requested by other vehicles.

SUMMARY

Described are embodiments of a vehicular cloud planner system installed in a roadside edge server or a cloud server and a vehicular cloud client installed in an onboard unit of a connected vehicle. The vehicular cloud planner system and the vehicular cloud client cooperate with one another to provide on-demand formation of stationary vehicular micro clouds responsive to an occurrence of one or more events.

In some embodiments, the vehicular cloud planner system determines event data describing a set of events that are configured for triggering formation of an on-demand stationary vehicular micro cloud in a geographic region. An occurrence of any event in the set of events may initiate a creation of the on-demand stationary vehicular micro cloud. For example, the set of events describes a list of conditions under which the vehicular cloud client installed in the connected vehicle may initiate the creation of a new on-demand stationary vehicular micro cloud. The vehicular cloud planner system transmits the event data to the vehicular cloud client via a wireless network.

Responsive to receiving the event data from the vehicular cloud planner system, the vehicular cloud client builds an event template base using the event data. The connected vehicle includes an onboard sensor set that monitors for an occurrence of the set of events. For example, the onboard sensor set can be configured for monitoring for the list of conditions. In a further example, the vehicular cloud client monitors the sensor data for any condition that is included in the list of conditions described by the event data. If a condition included in the list of conditions is met (e.g., if an occurrence of any event described by the event data is detected), the vehicular cloud client performs one or more of the following operations: (1) determining whether a stationary vehicular micro cloud is currently formed in a geographic region designated for an on-demand stationary vehicular micro cloud; (2) take actions to form the on-demand stationary vehicular micro cloud if no stationary vehicular micro cloud is currently formed in the geographic region; (3) executing a set of tasks using either the new on-demand stationary vehicular micro cloud formed at operation (2) or the stationary vehicular micro cloud that may have been identified at operation (1).

The set of tasks are also described by the event data, and the tasks to be executed may be different for different types of conditions. For example, depending on a type of an event that occurs, the tasks to be executed in the on-demand stationary vehicular micro cloud may be different. In a further example, if an occurrence of a first event is detected, one or more first tasks may be executed; however, if an occurrence of a second event is detected, one or more second tasks may be executed.

At least an example advantage and improvement provided by the vehicular cloud planner system and the vehicular cloud client described herein over existing solutions include that the vehicular cloud planner system and the vehicular cloud client may cooperate with one another to beneficially form on-demand stationary vehicular micro clouds responsive to an occurrence of roadway events. The roadway events may be detrimental to safety or optimum driving conditions. The vehicular cloud planner system and the vehicular cloud client described herein beneficially ensure that stationary vehicular micro clouds are formed at locations where computing resources are needed as determined based on an occurrence of these possibly detrimental roadway events.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method for a connected vehicle including: receiving event data that describes a set of events configured for triggering a creation of an on-demand stationary vehicular micro cloud; receiving sensor data that describes a roadway environment; detecting, based at least in part on the sensor data, an occurrence of at least one event included in the set of events; and modifying an operation of a communication unit of the connected vehicle to initiate the creation of the on-demand stationary vehicular micro cloud to address the occurrence of the at least one event. Other embodiments of this aspect include corresponding computer systems, apparatus, and computer programs recorded on one or more computer storage devices, each configured to perform the actions of the methods.

Implementations may include one or more of the following features. The method further including: building an event template base using the event data, where the event template base maintains the set of events. The method where detecting, based at least in part on the sensor data, the occurrence of the at least one event includes: using the event template base to analyze the sensor data so that an analysis result is generated for the sensor data; identifying that the at least one event is described by the sensor data based on the analysis result; and responsive to the at least one event being described by the sensor data, detecting the occurrence of the at least one event. The method where the event template base includes one or more of: program codes used for detecting the occurrence of the at least one event; a cloud geographic region where the on-demand stationary vehicular micro cloud is formed; one or more resource requirements of the on-demand stationary vehicular micro cloud; a set of termination conditions of the on-demand stationary vehicular micro cloud; and one or more tasks to be executed in the on-demand stationary vehicular micro cloud. The method where the cloud geographic region is different from an event geographic region where the at least one event occurs. The method where the cloud geographic region is identical to an event geographic region where the at least one event occurs. The method where modifying the operation of the communication unit of the connected vehicle to initiate the creation of the on-demand stationary vehicular micro cloud includes: determining whether a stationary vehicular micro cloud is currently formed in a cloud geographic region for the on-demand stationary vehicular micro cloud; and responsive to no stationary vehicular micro cloud being currently formed in the cloud geographic region, configuring the connected vehicle to be a cloud leader in the on-demand stationary vehicular micro cloud or instructing another vehicle in the cloud geographic region to be the cloud leader in the on-demand stationary vehicular micro cloud, and responsive to the connected vehicle being the cloud leader, modifying one or more operation elements of the communication unit of the connected vehicle to communicate with one or more nearby vehicles so that the one or more nearby vehicles are invited by the connected vehicle to join the on-demand stationary vehicular micro cloud for the cloud geographic region, or, responsive to the other vehicle being the cloud leader, modifying the one or more operation elements of the communication unit of the connected vehicle to communicate with the other vehicle so that the other vehicle is notified to be the cloud leader and to create the on-demand stationary vehicular micro cloud for the cloud geographic region. The method where the one or more operation elements of the communication unit include one or more of the following: one or more active Vehicle-to-Everything (V2X) channels to be operated on the communication unit; one or more active V2X radios to be operated on the communication unit; one or more active V2X antennas to be operated on the communication unit; one or more operating frequencies of the one or more active V2X channels; one or more beamforming techniques performed on the one or more active V2X antennas; and a bandwidth allocation scheme of the communication unit. The method further including: determining that the connected vehicle leaves the cloud geographic region associated with the on-demand stationary vehicular micro cloud; and performing a handover operation to hand over a role of the cloud leader from the connected vehicle to another member in the on-demand stationary vehicular micro cloud. The method further including: executing one or more tasks described by the event data with one or more members in the on-demand stationary vehicular micro cloud. The method where the set of events includes one or more of: a lane closure; a traffic accident; a traffic jam; presence of available parking space; and presence of a crowd of people. Implementations of the described techniques may include hardware, a method or process, or computer software on a computer-accessible medium.

One general aspect includes a system including a processor and a non-transitory memory storing computer code which, when executed by the processor, causes the processor to: receive event data that describes a set of events configured for triggering a creation of an on-demand stationary vehicular micro cloud; receive sensor data that describes a roadway environment; detect, based at least in part on the sensor data, an occurrence of at least one event included in the set of events; and modify an operation of a communication unit of the connected vehicle to initiate the creation of the on-demand stationary vehicular micro cloud to address the occurrence of the at least one event. Other embodiments of this aspect include corresponding computer systems, apparatus, and computer programs recorded on one or more computer storage devices, each configured to perform the actions of the methods.

Implementations may include one or more of the following features. The system where the computer code, when executed by the processor, causes the processor further to: build an event template base using the event data, where the event template base maintains the set of events. The system where the computer code, when executed by the processor, causes the processor to detect, based at least in part on the sensor data, the occurrence of the at least one event at least by: using the event template base to analyze the sensor data so that an analysis result is generated for the sensor data; identifying that the at least one event is described by the sensor data based on the analysis result; and responsive to the at least one event being described by the sensor data, detecting the occurrence of the at least one event. The system where the event template base includes one or more of: program codes used for detecting the occurrence of the at least one event; a cloud geographic region where the on-demand stationary vehicular micro cloud is formed; one or more resource requirements of the on-demand stationary vehicular micro cloud; a set of termination conditions of the on-demand stationary vehicular micro cloud; and one or more tasks to be executed in the on-demand stationary vehicular micro cloud. The system where the cloud geographic region is different from an event geographic region where the at least one event occurs. The system where the cloud geographic region is identical to an event geographic region where the at least one event occurs. The system where the computer code, when executed by the processor, causes the processor to modify the operation of the communication unit of the connected vehicle to initiate the creation of the on-demand stationary vehicular micro cloud at least by: determining whether a stationary vehicular micro cloud is currently formed in a cloud geographic region for the on-demand stationary vehicular micro cloud; and responsive to no stationary vehicular micro cloud being currently formed in the cloud geographic region, configuring the connected vehicle to be a cloud leader in the on-demand stationary vehicular micro cloud or instructing another vehicle in the cloud geographic region to be the cloud leader in the on-demand stationary vehicular micro cloud, and responsive to the connected vehicle being the cloud leader, modifying one or more operation elements of the communication unit of the connected vehicle to communicate with one or more nearby vehicles so that the one or more nearby vehicles are invited by the connected vehicle to join the on-demand stationary vehicular micro cloud for the cloud geographic region, or, responsive to the other vehicle being the cloud leader, modifying the one or more operation elements of the communication unit of the connected vehicle to communicate with the other vehicle so that the other vehicle is notified to be the cloud leader and to create the on-demand stationary vehicular micro cloud for the cloud geographic region. Implementations of the described techniques may include hardware, a method or process, or computer software on a computer-accessible medium.

One general aspect includes a computer program product including a non-transitory memory storing computer-executable code that, when executed by a processor, causes the processor to: receive event data that describes a set of events configured for triggering a creation of an on-demand stationary vehicular micro cloud; receive sensor data that describes a roadway environment; detect, based at least in part on the sensor data, an occurrence of at least one event included in the set of events; and modify an operation of a communication unit of the connected vehicle to initiate the creation of the on-demand stationary vehicular micro cloud to address the occurrence of the at least one event. Other embodiments of this aspect include corresponding computer systems, apparatus, and computer programs recorded on one or more computer storage devices, each configured to perform the actions of the methods.

Implementations may include one or more of the following features. The computer program product where the computer-executable code, when executed by the processor, causes the processor further to: build an event template base using the event data, where the event template base maintains the set of events. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
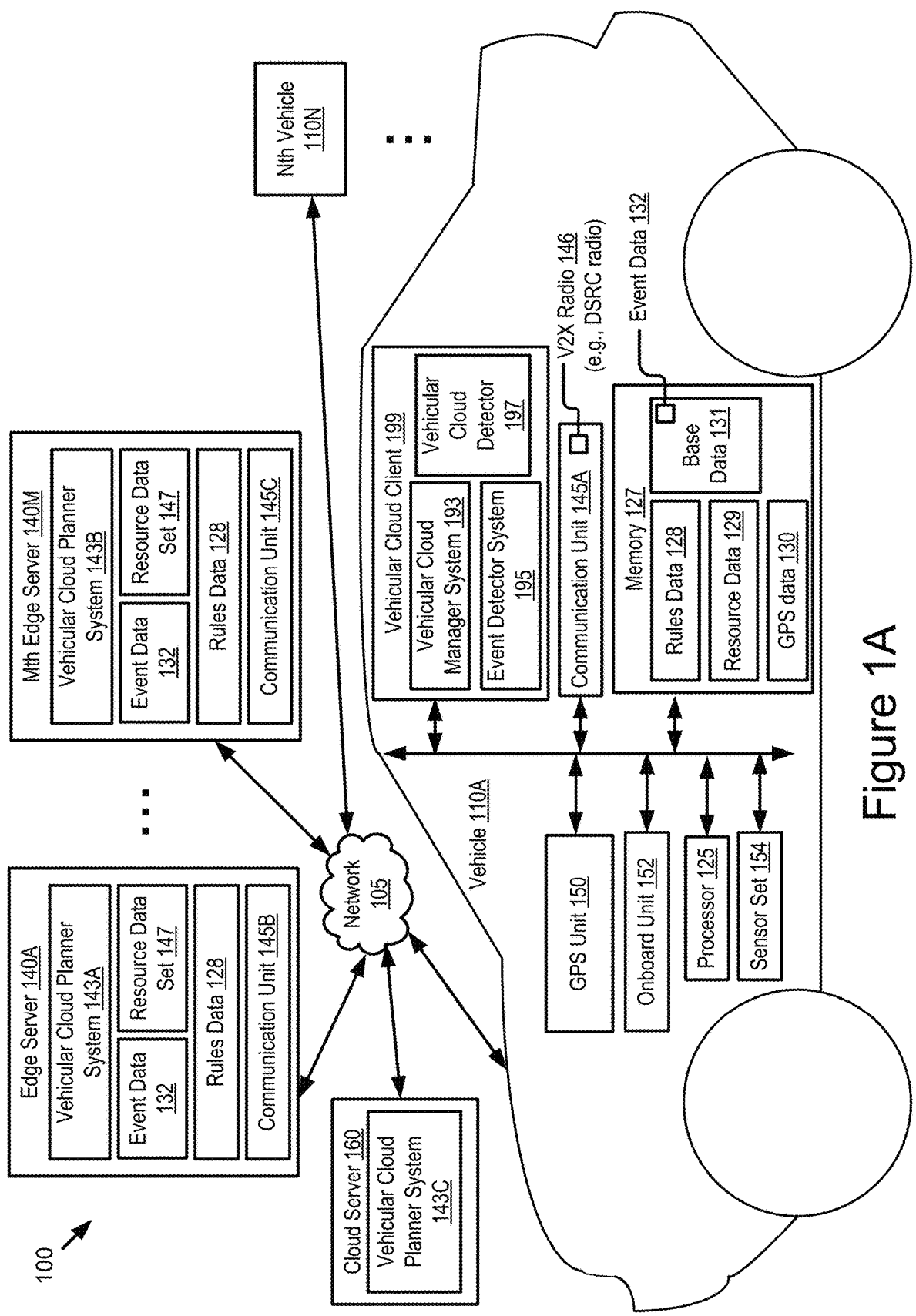
FIG. 1A is a block diagram illustrating an operating environment for a vehicular cloud planner system and a vehicular cloud client according to some embodiments.

Connected vehicles that are close by one another can form a vehicular micro cloud and are referred to as "micro cloud members" or "members of the vehicular micro cloud" herein. The connected vehicles collaboratively perform computation, data storage, sensing, communication tasks and any combination thereof among the micro cloud members over Vehicle-to-Everything (V2X) networks such as V2V networks, including but not limited to the following: (1) collaboratively performing resource-intensive computational tasks among the multiple micro cloud members; (2) collaboratively keeping and updating data content among the multiple micro cloud members; (3) collaboratively performing sensing of road conditions by on-board sensors of the multiple micro cloud members; and (4) collaboratively downloading or uploading data content from or to a cloud server (or an edge server).

Using vehicular micro clouds removes the need for the connected vehicles to access remote cloud servers or edge servers by vehicle-to-network (V2N) communications (e.g., by cellular networks) whenever they need to get access to data (e.g., high-definition road map for automated driving). Depending on mobility of the vehicular micro clouds, the vehicular micro clouds can be categorized into two types by way of examples: a stationary vehicular micro cloud; and a mobile vehicular micro cloud.

A stationary vehicular micro cloud can be tied to a certain geographical region (e.g., an intersection). A vehicle joins a stationary vehicular micro cloud when entering a pre-defined geographical region of the stationary vehicular micro cloud and leaves the stationary vehicular micro cloud when exiting from the pre-defined geographical region. When exiting from the pre-defined geographical region, the vehicle also hands over on-going tasks and data of the stationary vehicular micro cloud to other micro cloud members. In some embodiments, parked vehicles can also be members of the stationary vehicular micro cloud.

In a mobile vehicular micro cloud, a member leader (e.g., a connected vehicle which acts as a leader in the vehicular micro cloud) can invite its neighboring vehicles to join the mobile vehicular micro cloud. Unlike the stationary vehicular micro cloud, the mobile vehicular micro cloud moves as the member leader moves. The member leader recruits other micro cloud members into the mobile vehicular micro cloud and distributes sub-tasks to the other micro cloud members for collaborative task execution.

However, existing stationary vehicular micro clouds are formed only at locations that are pre-assigned by edge servers or cloud servers, which is overly limiting. Some use cases may require on-demand formation of stationary vehicular micro clouds when a predefined event occurs. Thus, existing solutions are not adequate because they do not consider the benefits of stationary vehicular micro clouds that are formed on-demand responsive to an occurrence of an event. These existing solutions also do not include a list of the types of events to monitor for or the actions to be taken responsive to the occurrence of one of these events, as well as other features that are described below.

Different from the existing solutions, the vehicular cloud planner system and the vehicular cloud client described herein cooperate with one another to provide on-demand formation of stationary vehicular micro clouds responsive to an occurrence of a predefined event. The vehicular cloud planner system and the vehicular cloud client are described below in more detail.

As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

Example Overview

Referring to FIG. 1A, depicted is an example operating environment 100 for a vehicular cloud client 199 and a vehicular cloud planner system 143. For example, the operating environment 100 includes one or more vehicles 110, one or more edge servers 140 and a cloud server 160. The one or more vehicles 110 include a first vehicle 110A, . . . , and an Nth vehicle 110N, which may provide similar functionality and are referred to herein as "vehicle 110" individually or collectively, where N is a positive integer greater than or equal to one. The one or more edge servers 140 includes a first edge server 140A, . . . , and an Mth edge server 140M, which may provide similar functionality and are referred to herein as "edge server 140" individually or collectively, where M is a positive integer greater than or equal to one. These elements of the operating environment 100 may be communicatively coupled to a network 105. Optionally, the operating environment 100 further includes one or more roadside units or other infrastructure devices (not shown in the figure).

Although two vehicles 110, two edge servers 140, one cloud server 160 and one network 105 are depicted in FIG. 1A, in practice the operating environment 100 may include one or more vehicles 110, one or more edge servers 140, one or more cloud servers 160 and one or more networks 105.

For example, there are "N" number of DSRC-enabled vehicles nearby the vehicle 110 having the vehicular cloud client 199. The vehicular cloud client 199 of the vehicle 110 uses event data to determine whether the vehicle 110 needs to form an on-demand stationary vehicular micro cloud with other DSRC-enabled vehicles which are nearby. However, it is not required that all of the "N" number of DSRC-enabled vehicles include a vehicular cloud client. Of course, in some embodiments each of the "N" DSRC-enabled vehicles can include a vehicular cloud client.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2V, LTE-V2I, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 includes a V2X network (e.g., a V2X wireless network). The V2X network is a communication network that enables entities such as elements of the operating environment 100 to wirelessly communicate with one another via one or more of the following: Wi-Fi; cellular communication including 3G, 4G, LTE, 5G, etc.; Dedicated Short Range Communication (DSRC); millimeter wave communication; etc.

In some embodiments, the vehicle 110 may be a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the geographic position of the vehicle with lane-level accuracy. In addition, the current standard for DSRC requires that the geographic position of the vehicle be described with lane-level accuracy.

As used herein, the words "geographic location," "location," "geographic position" and "position" refer to a latitude and longitude of an object (or, a latitude, longitude, and elevation of an object) such as a connected vehicle. The example embodiments described herein provide positioning information that describes a geographic position of a vehicle with an accuracy of one or more of: (1) at least plus or minus 1.5 meters in relation to the actual geographic position of the vehicle in two dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

The vehicle 110 may be any type of vehicle. The vehicle 110 may be one of the following types of vehicles: a car; a truck; a sports utility vehicle; a bus; a semi-truck; a drone or any other roadway-based conveyance. In some embodiments, the vehicle 110 includes a communication unit such that the vehicle is a "connected vehicle," where the communication unit includes any hardware and software that is needed to enable the vehicle 110 to communicate with other entities via the network 105.

In some embodiments, the vehicle 110 may be an autonomous vehicle or a semi-autonomous vehicle. For example, the vehicle 110 may include one or more Advanced Driver- Assistance Systems (ADAS systems). The one or more ADAS systems may provide some or all of the functionality that provides autonomous functionality.

In some embodiments, the vehicle 110 includes the vehicular cloud client 199, a communication unit 145A, a processor 125, a memory 127, a GPS unit 150, an onboard unit 152 and a sensor set 154.

The processor 125 includes an arithmetic logic unit, a microprocessor, a general-purpose controller, or some other processor array to perform computations. The processor 125 processes data signals and may include various computing architectures including a complex instruction set computer (CISC) architecture, a reduced instruction set computer (RISC) architecture, or an architecture implementing a combination of instruction sets. The vehicle 110 may include one or more processors 125. Other processors, operating systems, sensors, displays, and physical configurations may be possible.

For example, the processor 125 can be an element of the onboard unit 152 or an electronic control unit of the vehicle 110.

The memory 127 stores instructions or data that may be executed by the processor 125 of the vehicle 110. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The vehicle 110 may include one or more memories 127.

In some embodiments, the memory 127 stores one or more of the following elements: rules data 128; resource data 129; GPS data 130; and base data 131.

The rules data 128 includes digital data that controls in what conditions a stationary vehicular micro cloud is formed by the vehicular cloud detector 197.

The resource data 129 includes digital data that describes unused computing resources for the vehicle 110. The functionality of the vehicular cloud detector 197, as well as the contents of the rules data 128 and the resource data 129, is described in detail in U.S. patent application Ser. No. 15/845,945, the entirety of which is herein incorporated by reference. Accordingly, the functionality of the vehicular cloud detector 197, and the contents of the rules data 128 and the resource data 129, will not be described in detail here.

The GPS data 130 may include digital data describing a geographic location of the vehicle 110. For example, the GPS data 130 includes digital data describing a latitude and longitude of the vehicle 110 (or, a latitude, longitude, and elevation of the vehicle 110).

The base data 131 includes digital data that describes an event template base. In some embodiments, the event template base maintains a set of events, and an occurrence of any event in the set of events may cause formation of an on-demand stationary vehicular micro cloud. For example, the event template base includes one or more of: program codes used for detecting an occurrence of any event included in the set of events; a cloud geographic region where an on-demand stationary vehicular micro cloud is formed; one or more resource requirements of the on-demand stationary vehicular micro cloud; a set of termination conditions (e.g., lifespan) of the on-demand stationary vehicular micro cloud; and one or more tasks to be executed in the on-demand stationary vehicular micro cloud.

In some embodiments, the base data 131 also includes event data 132. The event data 132 includes digital data that describes the set of events that may trigger the formation of an on-demand stationary vehicular micro cloud if a stationary vehicular micro cloud is not already formed based on one or more rules defined in the rules data 128. These events may or may not be detrimental. Examples of the events include, but are not limited to, one or more of the following: a lane closure; a traffic accident; a traffic jam; presence of available parking space; and presence of a crowd of people (e.g., presence of a crowd of curious onlookers gathered around something).

In some embodiments, the event data 132 also describes one or more tasks or remedial actions to be executed responsive to detecting an occurrence of one or more events included in the set of events by the vehicular cloud client 199.

The communication unit 145A transmits and receives data to and from the network 105 or to another communication channel. In some embodiments, the communication unit 145A may include a DSRC transceiver, a DSRC receiver and other hardware or software necessary to make the connected vehicle a DSRC-enabled device. For example, the communication unit 145A includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

In some embodiments, the communication unit 145A includes a V2X radio 146 used for conducting V2X communications. For example, the V2X radio 146 includes a DSRC radio. In another example, the V2X radio 146 includes hardware, software, or a combination thereof for performing mmWave communications. Other examples of the V2X radio 146 are possible. It should be noted that DSRC is not a requirement here. Embodiments described herein can be implemented with any form of V2X communications.

In some embodiments, the GPS unit 150 is a conventional GPS unit of the vehicle 110. For example, the GPS unit 150 may include hardware that wirelessly communicates with a GPS satellite to retrieve data that describes a geographic location of the vehicle 110. For example, the GPS unit 150 retrieves GPS data from one or more GPS satellites. In some embodiments, the GPS unit 150 is a DSRC-compliant GPS unit of the vehicle 110 that is operable to provide GPS data describing the geographic location of the vehicle 110 with lane-level accuracy.

The onboard unit 152 can include one or more processors and one or more memories. For example, the onboard unit 152 includes an electronic control unit (ECU). The ECU is an embedded system in automotive electronics that controls one or more of electrical systems or subsystems in the vehicle 110. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the vehicular cloud client 199 is installed in the onboard unit 152.

The sensor set 154 includes one or more sensors that are operable to measure a roadway environment outside of the vehicle 110. For example, the sensor set 154 may include one or more sensors that record one or more physical characteristics of the road environment that is proximate to the vehicle 110. The memory 127 may store sensor data that describes the one or more physical characteristics recorded by the sensor set 154. The roadway environment outside of the vehicle 110 may include the other vehicles 110 (as well as other objects or people) in the operating environment 100, and so, one or more sensors of the sensor set 154 may record sensor data that describes information about the other vehicles (as well as other objects or people) in the operating environment 100.

In some embodiments, the sensor set 154 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the vehicular cloud client 199 includes software that is operable, when executed by the processor 125 of the vehicle 110, to cause the processor 125 to execute one or more steps of example flow processes 181 and 183 and methods 300, 400 and 500 with reference to FIGS. 1B, 1C, and 3-5.

In some embodiments, the vehicular cloud client 199 may be implemented using hardware including a field-programmable gate array ("FPGA") or an application-specific integrated circuit ("ASIC"). In some other embodiments, the vehicular cloud client 199 may be implemented using a combination of hardware and software. The vehicular cloud client 199 may be stored in a combination of the devices (e.g., vehicles or other devices), or in one of the devices.

In some embodiments, the vehicular cloud client 199 is installed in the onboard unit 152 of the vehicle 110 (e.g., an electronic control unit or some other onboard vehicle computer). The vehicular cloud client 199 includes one or more of the following elements: a vehicular cloud manager system 193; an event detector system 195; and a vehicular cloud detector 197.

The event detector system 195 includes code and routines that are operable, when executed by the processor 125 of the vehicle 110, to cause the processor 125 to execute one or more of the following operations: (1) receiving the event data 132 from the network 105 which is provided by the vehicular cloud planner system 143; (2) building an event template base using the event data 132; (3) causing the sensor set 154 to gather sensor data describing an external environment of the vehicle 110; (4) optionally, receiving sensor data from other vehicles 110 via V2X communications; (5) analyzing the sensor data and the event data included in the event template base to identify whether an event described by the event data is described by the sensor data; and (6) notifying the vehicular cloud manager system 193 when any event described by the event data is identified.

The vehicular cloud manager system 193 includes code and routines that are operable, when executed by the processor 125 of the vehicle 110, to cause the processor 125 to execute one or more of the following operations: (1) receiving a notification from the event detector system 195 that an event described by the event data has been identified; (2) determining whether a stationary vehicular micro cloud has already been generated either based on the rules data 128 and the resource data 129 as described in U.S. patent application Ser. No. 15/845,945 or responsive to the event detector system 195 detecting a pre-defined event; (3) if no stationary vehicular micro cloud has been generated, generating an on-demand stationary vehicular micro cloud; and (4) causing either the stationary vehicular micro cloud identified at operation (2) or the on-demand stationary vehicular micro cloud generated at operation (3) to execute one or more tasks that are described by the event data.

The vehicular cloud detector 197 is operable to use the rules data 128 and the resource data 129 to generate a stationary vehicular micro cloud as described in U.S. patent application Ser. No. 15/845,945 (referred to the stationary vehicular micro cloud at operation (2) executed by the vehicular cloud manager system 193 as described above).

The vehicular cloud client 199, as well as the vehicular cloud manager system 193, the event detector system 195 and the vehicular cloud detector 197, is further described below with reference to FIGS. 1B-5.

The edge server 140 includes a processor-based computing device which is installed in a roadside unit ("RSU") or some other processor-based infrastructure component of a roadway. In the operating environment 100 illustrated in FIG. 1A, the roadway includes M edge servers 140A . . . 140M, where M is any positive integer greater than or equal to one. The edge server 140A includes a vehicular cloud planner system 143A and a communication unit 145B. The edge server 140A stores one or more of the event data 132, a resource data set 147 and the rules data 128. The edge server 140M includes a vehicular cloud planner system 143B and a communication unit 145C. The edge server 140M also stores one or more of the event data 132, the resource data set 147 and the rules data 128.

The resource data set 147 includes a set of resource data 129. The resource data 129, the event data 132 and the rules data 128 are described above, and similar description is not repeated here.

In some embodiments, edge servers 140 are not available. For example, roadside units may not be available in rural environments to serve as edge servers. Accordingly, the cloud server 160 can host an instance of the vehicular cloud planner system (e.g., a vehicular cloud planner system 143C) so that this cloud-based vehicular cloud planner system can serve rural vehicles. Accordingly, embodiments described herein can be applied in urban environments as well as rural environments.

The vehicular cloud planner systems 143A, 143B and 143C may have similar structure and provide similar functionality. Thus, the vehicular cloud planner systems 143A, 143B and 143C can be referred to as "vehicular cloud planner system 143" individually or collectively.

The vehicular cloud planner system 143 includes software that is operable, when executed by a processor of the edge server 140 or the cloud server 160, to cause the processor to execute one or more of the following operations: receiving multiple instances of resource data from multiple vehicles 110; aggregating the resource data to form the resource data set 147; analyzing the resource data set 147 to determine the rules data 128; and transmitting the rules data 128 to the vehicular cloud client 199 via the network 105. The vehicular cloud client 199 stores the rules data 128 in the memory 127 of the vehicle 110. The vehicular cloud planner system 143 also warehouses the event data 132. The vehicular cloud planner system 143 distributes the event data 132 to vehicular cloud clients 199 of various vehicles 110 via the network 105.

In some embodiments, the vehicular cloud planner system 143 may be implemented using hardware including a field-programmable gate array ("FPGA") or an application-specific integrated circuit ("ASIC"). In some other embodiments, the vehicular cloud planner system 143 may be implemented using a combination of hardware and software. The vehicular cloud planner system 143 may be stored in a combination of the devices (e.g., the edge server 140, the cloud server 160, the vehicle 110 or other devices), or in one of the devices.

Figure 1B:
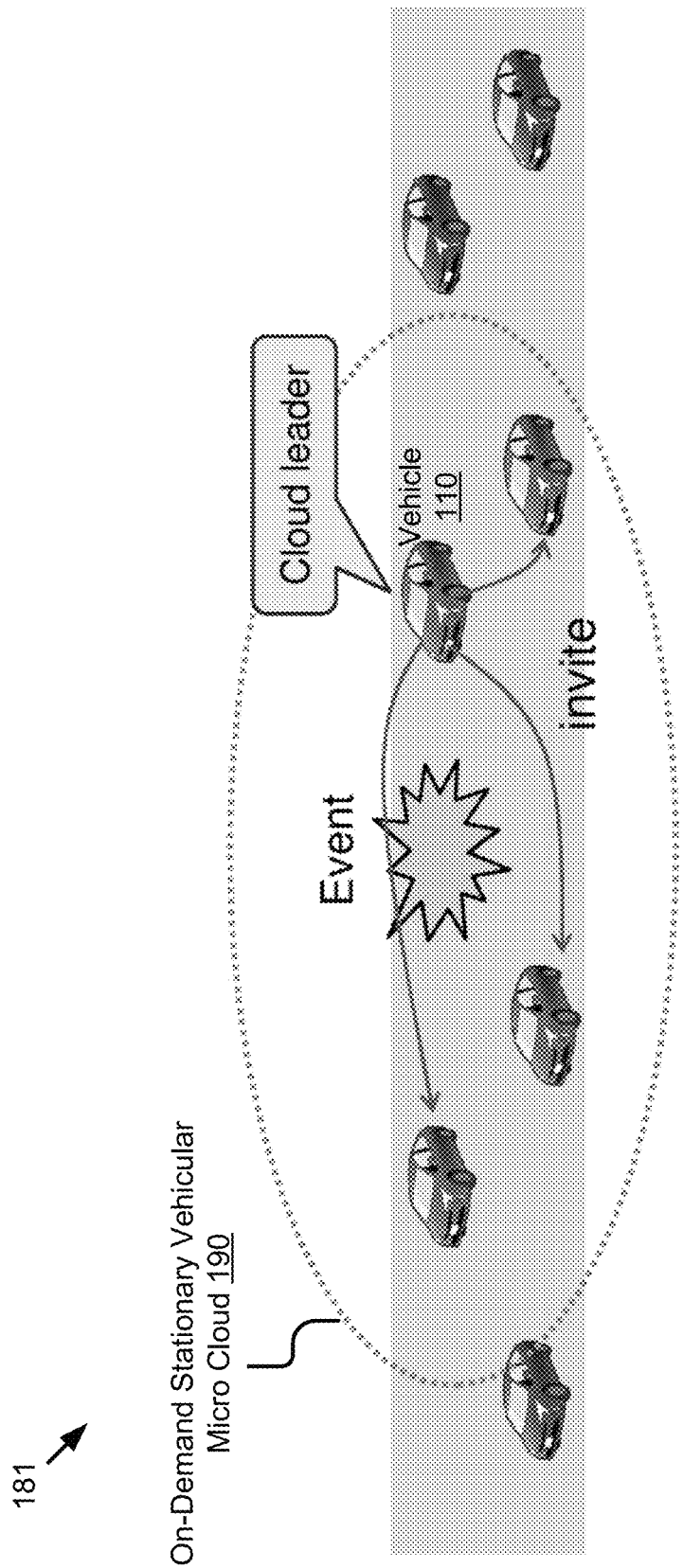
FIG. 1B is a graphic representation illustrating formation of an on-demand stationary vehicular micro cloud according to some embodiments.

Referring to FIG. 1B, an example flow process 181 for forming an on-demand stationary vehicular micro cloud 190 is illustrated according to some embodiments. If the vehicular cloud client 199 of a vehicle 110 detects an occurrence of a pre-defined event (e.g., a lane closure is detected), the vehicle 110 becomes a cloud leader. The vehicular cloud client 199 of the vehicle 110 initiates a creation of the on-demand stationary vehicular micro cloud 190. For example, the vehicle 110, serving as the cloud leader, communicates with neighboring vehicles via a V2X network such as a V2V network and invites the neighboring vehicles to join the on-demand stationary vehicular micro cloud 190.

In some embodiments, the on-demand stationary vehicular micro cloud 190 is dissolved when execution of one or more tasks is completed in the on-demand stationary vehicular micro cloud 190. In some other embodiments, the on-demand stationary vehicular micro cloud 190 is dissolved when a pre-defined time period elapses or some other pre-defined termination conditions are met.

Figure 1C:
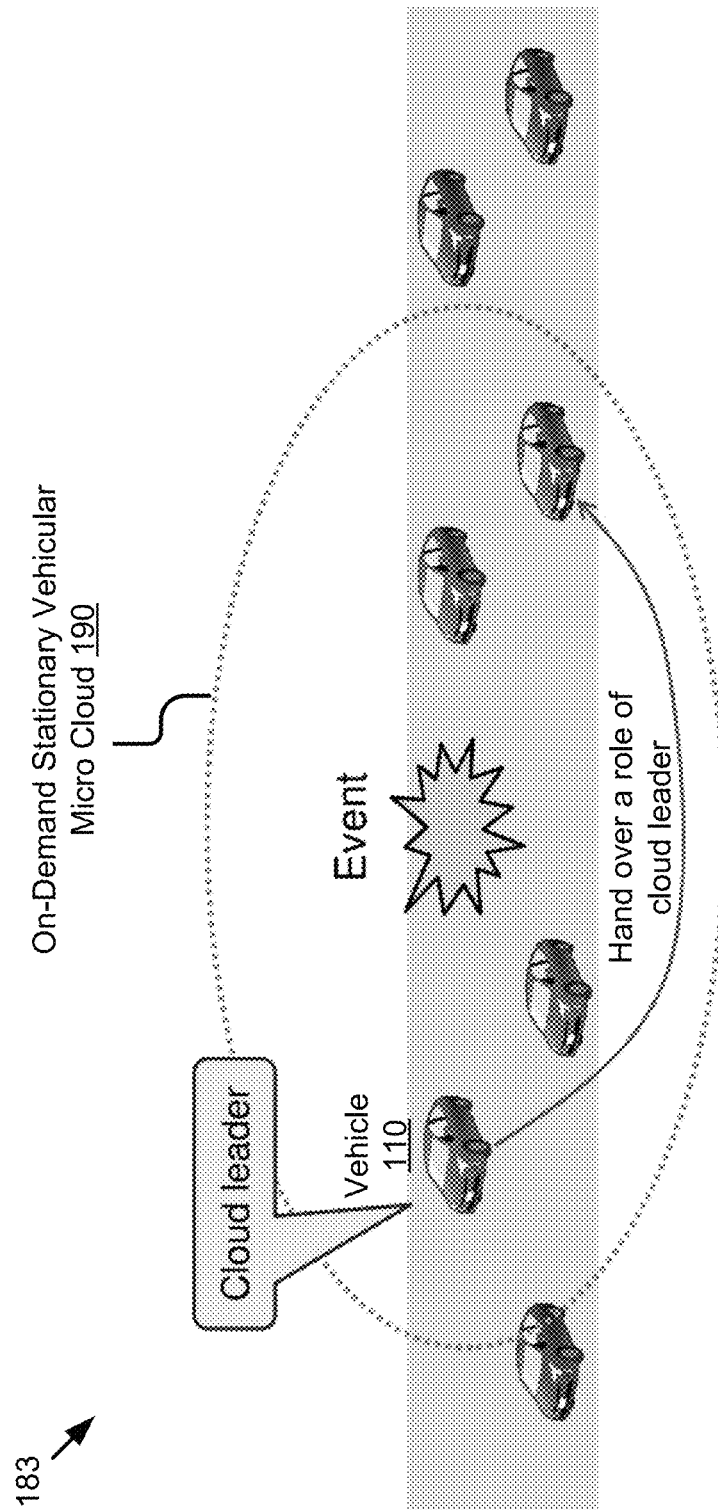
FIG. 1C is a graphic representation illustrating a handover of a cloud leader role in an on-demand stationary vehicular micro cloud according to some embodiments.

Referring to FIG. 1C, an example flow process 183 for performing a handover of a cloud leader role in the on-demand stationary vehicular micro cloud 190 is illustrated according to some embodiments. For example, the vehicular cloud client 199 of the cloud leader (e.g., the vehicle 110) determines that the vehicle 110 leaves a cloud geographic region associated with the on-demand stationary vehicular micro cloud 190. The vehicular cloud client 199 performs a handover operation to hand over a role of the cloud leader from the vehicle 110 to another member in the on-demand stationary vehicular micro cloud 190. For example, the vehicular cloud client 199 may assign the role of the cloud leader to another member of the on-demand stationary vehicular micro cloud 190 and transfers on-going tasks and relevant data to the other member of the on-demand stationary vehicular micro cloud 190 before leaving the on-demand stationary vehicular micro cloud 190.

Figure 1D:
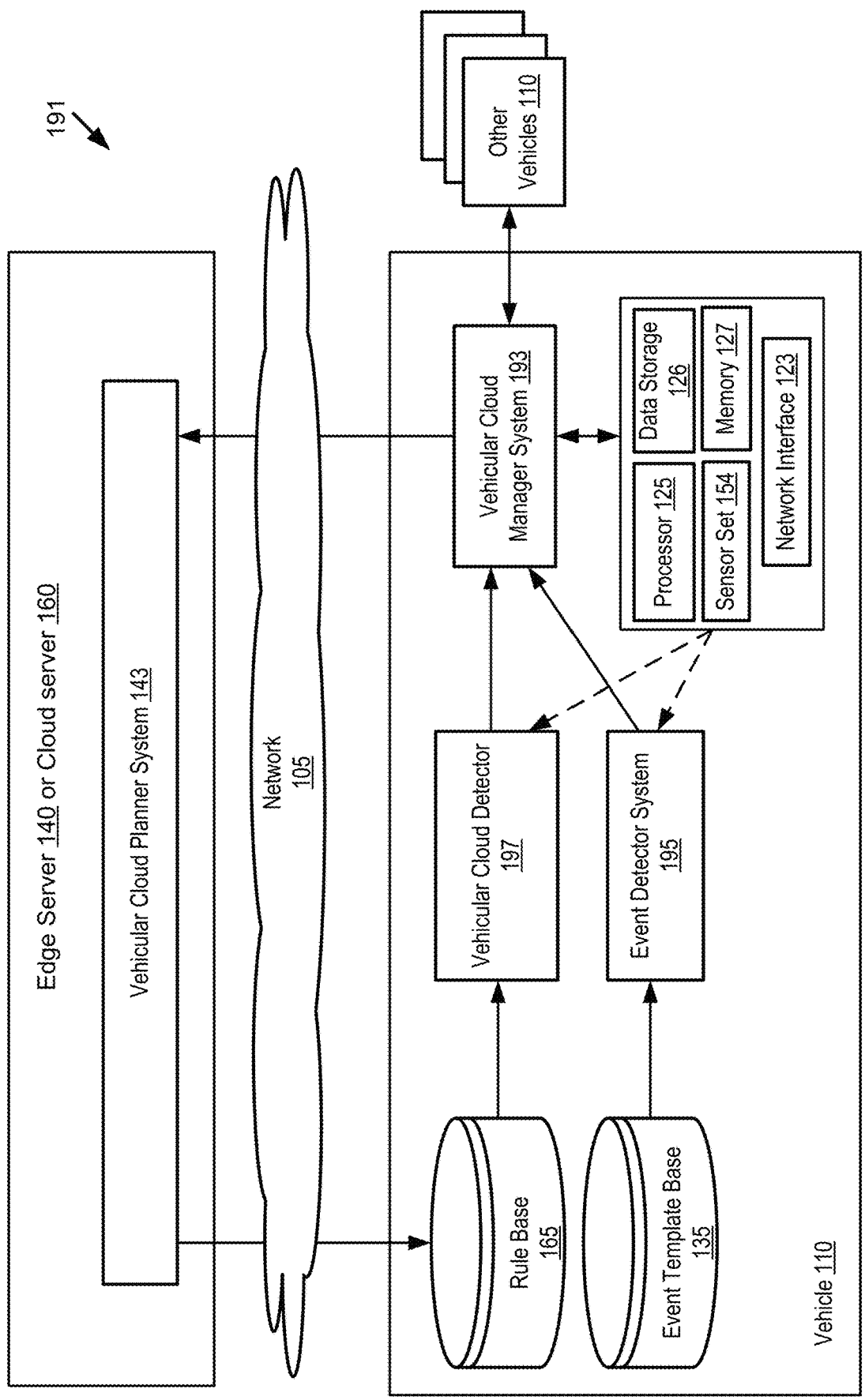
FIG. 1D is a block diagram illustrating a system overview of formation of stationary vehicular micro clouds according to some embodiments.

FIG. 1D is a block diagram illustrating a system overview 191 of formation of stationary vehicular micro clouds according to some embodiments. The vehicle 110 includes, for example, the processor 125, a data storage 126 for storing data, the sensor set 154, the memory 127 and a network interface 123.

In some embodiments, the vehicle 110 may receive rules data describing formation rules for pre-assigned stationary vehicular micro clouds at pre-assigned locations from the vehicular cloud planner system 143 and stores the rules data in a rule base 165. The vehicular cloud detector 197 receives sensor data from the sensor set 154 (e.g., sensor readings are illustrated by dashed arrow lines in FIG. 1D). The vehicular cloud detector 197 uses the sensor data, the rules data and resource data to generate a stationary vehicular micro cloud. For example, the vehicular cloud detector 197 sends an instruction to form a stationary vehicular micro cloud to the vehicular cloud manager system 193 so that the vehicular cloud manager system 193 of the vehicle 110 forms the stationary vehicular micro cloud with other vehicles 110. The vehicular cloud manager system 193 manages available resources in the stationary vehicular micro cloud and sends resource availability logs to the vehicular cloud planner system 143.

In some embodiments, the vehicle 110 receives event data from the vehicular cloud planner system 143 and stores the event data in an event template base 135. The event detector system 195 receives sensor data from the sensor set 154 and analyzes the sensor data using the event template base 135 to identify whether an event described by the event data is described by the sensor data. The event detector system 195 sends an instruction to form an on-demand stationary vehicular micro cloud to the vehicular cloud manager system 193 when an event described by the event data is identified.

The vehicular cloud manager system 193 receives the instruction from the event detector system 195. The vehicular cloud manager system 193 determines whether a stationary vehicular micro cloud has already been generated based on an instruction from the vehicular cloud detector 197. If no stationary vehicular micro cloud has been generated, the vehicular cloud manager system 193 of the vehicle 110 forms an on-demand stationary vehicular micro cloud with other nearby vehicles 110 and causes the on-demand stationary vehicular micro cloud to execute one or more tasks that are described by the event data.

Example Computer System

Figure 2:
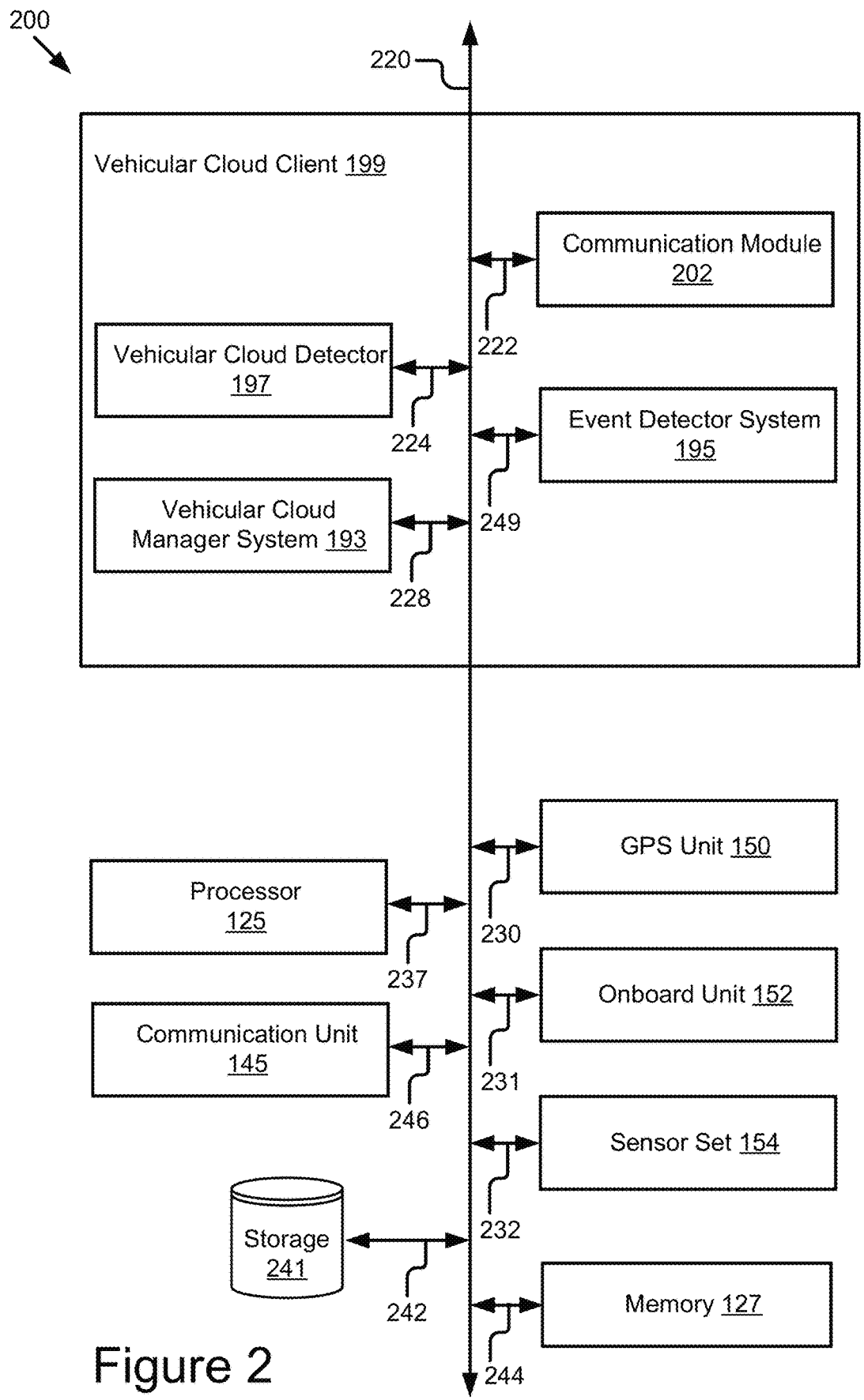
FIG. 2 is a block diagram illustrating an example computer system including a vehicular cloud client according to some embodiments.

Referring now to FIG. 2, depicted is a block diagram illustrating an example computer system 200 including the vehicular cloud client 199 according to some embodiments. In some embodiments, the computer system 200 may include a special-purpose computer system that is programmed to perform one or more steps of methods 300, 400 and 500 described below with reference to FIGS. 3-5.

In some embodiments, the computer system 200 is an on-board vehicle computer of the vehicle 110. In some embodiments, the computer system 200 is an onboard unit of the vehicle 110. In some embodiments, the computer system 200 is an electronic control unit (ECU), head unit or some other processor-based computing device of the vehicle 110.

The computer system 200 may include one or more of the following elements according to some examples: the vehicular cloud client 199; the processor 125; the memory 127; the communication unit 145; the GPS unit 150; the onboard unit 152; the sensor set 154; and a storage 241. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The GPS unit 150 is communicatively coupled to the bus 220 via a signal line 230. The onboard unit 152 is communicatively coupled to the bus 220 via a signal line 231. The sensor set 154 is communicatively coupled to the bus 220 via a signal line 232. The storage 241 is communicatively coupled to the bus 220 via a signal line 242. The memory 127 is communicatively coupled to the bus 220 via a signal line 244.

The processor 125, the memory 127, the communication unit 145, the GPS unit 150, the onboard unit 152 and the sensor set 154 are described above with reference to FIG. 1A, and so, similar description will not be repeated here. The memory 127 may store any of the data described above with reference to FIGS. 1A-1D. The memory 127 may store any data necessary for the computer system 200 to provide its functionality.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the vehicular cloud client 199 includes: a communication module 202; the vehicular cloud detector 197; the event detector system 195; and the vehicular cloud manager system 193. These components of the vehicular cloud client 199 are communicatively coupled to each other via the bus 220. In some embodiments, components of the vehicular cloud client 199 can be stored in a single device. In some other embodiments, components of the vehicular cloud client 199 can be distributed and stored across multiple devices.

The communication module 202 can be software including routines for handling communications between the vehicular cloud client 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, one or more of the following elements: event data; and rules data. The communication module 202 may send or receive any of the data or messages described above with reference to FIGS. 1A-1D via the communication unit 145.

In some embodiments, the communication module 202 receives data from components of the vehicular cloud client 199 and stores the data in one or more of the storage 241 and the memory 127. For example, the communication module 202 receives data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the vehicular cloud client 199. For example, the communication module 202 may handle communications among the vehicular cloud detector 197, the event detector system 195 and the vehicular cloud manager system 193. Any of these systems or modules may cause the communication module 202 to communicate with the other elements of the computer system 200 or the operating environment 100 (via the communication unit 145).

In some embodiments, the vehicular cloud detector 197 can be software including routines for using rules data and resource data to generate a stationary vehicular micro cloud. In some embodiments, the vehicular cloud detector 197 can be a set of instructions stored in the memory 127 of the computer system 200 and can be accessible and executable by the processor 125. The vehicular cloud detector 197 may be adapted for cooperation and communication with the processor 125 and other components of the computer system 200 via a signal line 224.

The vehicular cloud detector 197 is described in U.S. patent application Ser. No. 15/845,945, the entirety of which is incorporated here by reference.

The event detector system 195 can be software including routines that, when executed by the processor 125, cause the processor 125 to detect an occurrence of one or more events described by the event data. In some embodiments, the event detector system 195 can be a set of instructions stored in the memory 127 of the computer system 200 and can be accessible and executable by the processor 125. The event detector system 195 may be adapted for cooperation and communication with the processor 125 and other components of the computer system 200 via a signal line 249.

In some embodiments, the event detector system 195 receives, from the vehicular cloud planner system 143, event data that describes a set of events configured for triggering a creation of an on-demand stationary vehicular micro cloud. In some examples, the event data also includes configuration data for configuring one or more of a cloud geographic region, one or more resource requirements, and a set of termination conditions (e.g., lifespan) of the on-demand stationary vehicular micro cloud. In some examples, the event data further includes data describing one or more tasks to be executed in the on-demand stationary vehicular micro cloud.

The event detector system 195 builds an event template base using the event data. For example, the event template base maintains the set of events. In a further example, the event template base includes one or more of: program codes used for detecting an occurrence of one or more events described by the event data; a cloud geographic region where the on-demand stationary vehicular micro cloud is formed; one or more resource requirements of the on-demand stationary vehicular micro cloud; a set of termination conditions (e.g., lifespan) of the on-demand stationary vehicular micro cloud; and one or more tasks to be executed in the on-demand stationary vehicular micro cloud.

The event detector system 195 receives sensor data that describes a roadway environment of the vehicle 110. For example, the event detector system 195 causes the sensor set 154 to gather sensor data describing an external environment of the vehicle 110. Optionally, the event detector system 195 receives sensor data from other vehicles 110 via V2X communications.

The event detector system 195 monitors for an occurrence of any event described by the event data based on the sensor data. In some embodiments, the event detector system 195 detects, based at least in part on the sensor data, an occurrence of at least one event included in the set of events. Specifically, the event detector system 195 uses the event template base to analyze the sensor data so that an analysis result is generated for the sensor data (e.g., the event detector system 195 analyzes measurements from onboard sensors by program codes included in the event template base to detect whether an event that matches the event template base occurs). The event detector system 195 identifies whether any event described by the event data is described by the sensor data based on the analysis result. Responsive to at least one event from the set of events being described by the sensor data, the event detector system 195 detects the occurrence of the at least one event.

For example, the sensor data may include image data that depicts a closure of a lane. The event detector system 195 may analyze the sensor data to identify that a lane closure event included in the event template base is described by the sensor data. As a result, the event detector system 195 detects the occurrence of the lane closure event.

Next, the event detector system 195 notifies the vehicular cloud manager system 193 responsive to identifying an occurrence of at least one event described by the event data. For example, the event detector system 195 sends a notification describing the occurrence of the at least one event to the vehicular cloud manager system 193, where the notification includes one or more of a description of the event, a cloud geographic region where an on-demand stationary vehicular micro cloud is to be formed, an event geographic region where the event occurs and other relevant data. In some embodiments, the occurrence of the at least one event may represent a satisfaction of a pre-defined condition that triggers the vehicular cloud manager system 193 to initiate a creation of an on-demand stationary vehicular micro cloud.

In some embodiments, the cloud geographic region for the on-demand stationary vehicular micro cloud is different from the event geographic region where the at least one event occurs. For example, assume that an occurrence of a lane closure event is detected (e.g., all lanes are closed). The cloud geographic region can be 10 miles away from a region where the lane closure event occurs.

In some embodiments, the cloud geographic region is identical to the event geographic region where the at least one event occurs. For example, assume that an occurrence of an accident is detected. The cloud geographic region can be a region that centers at a location where the accident occurs or a region that covers the location where the accident occurs.

The vehicular cloud manager system 193 can be software including routines that, when executed by the processor 125, cause the processor 125 to create and manage an on-demand stationary vehicular micro cloud. In some embodiments, the vehicular cloud manager system 193 can be a set of instructions stored in the memory 127 of the computer system 200 and can be accessible and executable by the processor 125. The vehicular cloud manager system 193 may be adapted for cooperation and communication with the processor 125 and other components of the computer system 200 via a signal line 228.

In some embodiments, the vehicular cloud manager system 193 receives, from the event detector system 195, a notification describing that an occurrence of an event described by the event data has been identified. Responsive to receiving the notification, the vehicular cloud manager system 193 modifies an operation of the communication unit 145 of the vehicle 110 to initiate a creation of an on-demand stationary vehicular micro cloud.

For example, the vehicular cloud manager system 193 determines whether a stationary vehicular micro cloud is currently formed in a cloud geographic region for the on-demand stationary vehicular micro cloud (e.g., the vehicular cloud manager system 193 determines whether a stationary vehicular micro cloud has already been generated either based on the rules data 128 and the resource data 129 as described in U.S. patent application Ser. No. 15/845,945) or responsive to the event detector system 195 detecting a pre-defined event. Responsive to that a stationary vehicular micro cloud is currently formed in the cloud geographic region, the vehicular cloud manager system 193 causes the stationary vehicular micro cloud to execute one or more tasks that are described by the event data. In this case, there is no need to create the on-demand stationary vehicular micro cloud in the cloud geographic region.

However, if there is no stationary vehicular micro cloud currently formed in the cloud geographic region, the vehicular cloud manager system 193 configures the vehicle 110 to be a cloud leader in the on-demand stationary vehicular micro cloud or instructs another vehicle in the cloud geographic region to be the cloud leader in the on-demand stationary vehicular micro cloud. Responsive to the vehicle 110 being the cloud leader, the vehicular cloud manager system 193 modifies one or more operation elements of the communication unit 145 of the vehicle 110 to communicate with one or more nearby vehicles so that the one or more nearby vehicles are invited by the vehicle 110 to join the on-demand stationary vehicular micro cloud in the cloud geographic region. Or, responsive to the other vehicle being the cloud leader, the vehicular cloud manager system 193 modifies the one or more operation elements of the communication unit of the vehicle 110 to communicate with the other vehicle so that the other vehicle is notified to be the cloud leader and to create the on-demand stationary vehicular micro cloud for the cloud geographic region (e.g., the other vehicle is notified by the vehicle 110 to invite other vehicles in the cloud geographic region to join the on-demand stationary vehicular micro cloud).

In some embodiments, the vehicle 110 that detects the occurrence of the at least one event (e.g., a pre-defined event) can instruct one of the other vehicles in the cloud geographic region to become a cloud leader of the on-demand stationary vehicular micro cloud. For example, in a case that the vehicle 110 detecting the occurrence of the at least one event is likely to leave the cloud geographic region in a short period of time, or if the vehicular micro cloud is to be formed in a region that is far away from a location where the event occurs, the vehicle 110 can instruct another vehicle located in the cloud geographic region to become a cloud leader such that the other vehicle can initiate creation of the on-demand stationary vehicular micro cloud.

In some embodiments, the one or more operation elements of the communication unit 145 include one or more of the following: one or more active V2X channels to be operated on the communication unit 145; one or more active V2X radios to be operated on the communication unit 145; one or more active V2X antennas to be operated on the communication unit 145; one or more operating frequencies of the one or more active V2X channels; one or more beamforming techniques performed on the one or more active V2X antennas; and a bandwidth allocation scheme of the communication unit 145.

For example, responsive to initiating a creation of an on-demand stationary vehicular micro cloud, the vehicular cloud manager system 193 can modify one or more of the following operation elements of the communication unit 145: (1) increasing the number of active V2X channels so that more V2X channels can be used to communicate with nearby vehicles simultaneously; (2) changing a beamforming technique applied on one or more V2X antennas so that a signal transmitted to a nearby vehicle with a farther distance may have a higher signal strength; and (3) allocating more bandwidth to the communication unit 145 so that data can be exchanged with other nearby vehicles once they join the on-demand stationary vehicular micro cloud. In this way, communication efficiency in the on-demand stationary vehicular micro cloud can be improved.

After the on-demand stationary vehicular micro cloud is formed in the cloud geographic region, the vehicular cloud manager system 193 causes the on-demand stationary vehicular micro cloud to execute one or more tasks that are described by the event data.

Generally, the on-demand stationary vehicular micro cloud only serves a limited geographic area. The vehicular cloud manager system 193 of the vehicle 110 hands over leadership of the on-demand stationary vehicular micro cloud when the vehicle 110 leaves the cloud geographic area that is served by the on-demand stationary vehicular micro cloud. For example, the vehicular cloud manager system 193 determines that the vehicle 110 leaves the cloud geographic region associated with the on-demand stationary vehicular micro cloud and performs a handover operation to hand over a role of the cloud leader from the vehicle 110 to another member in the on-demand stationary vehicular micro cloud. In a further example, the vehicular cloud manager system 193 of the vehicle 110 assigns another member in the on-demand stationary vehicular micro cloud to be a new cloud leader and hands over data and ongoing tasks from the vehicle 110 to the new cloud leader.

Example Processes

Figure 3:
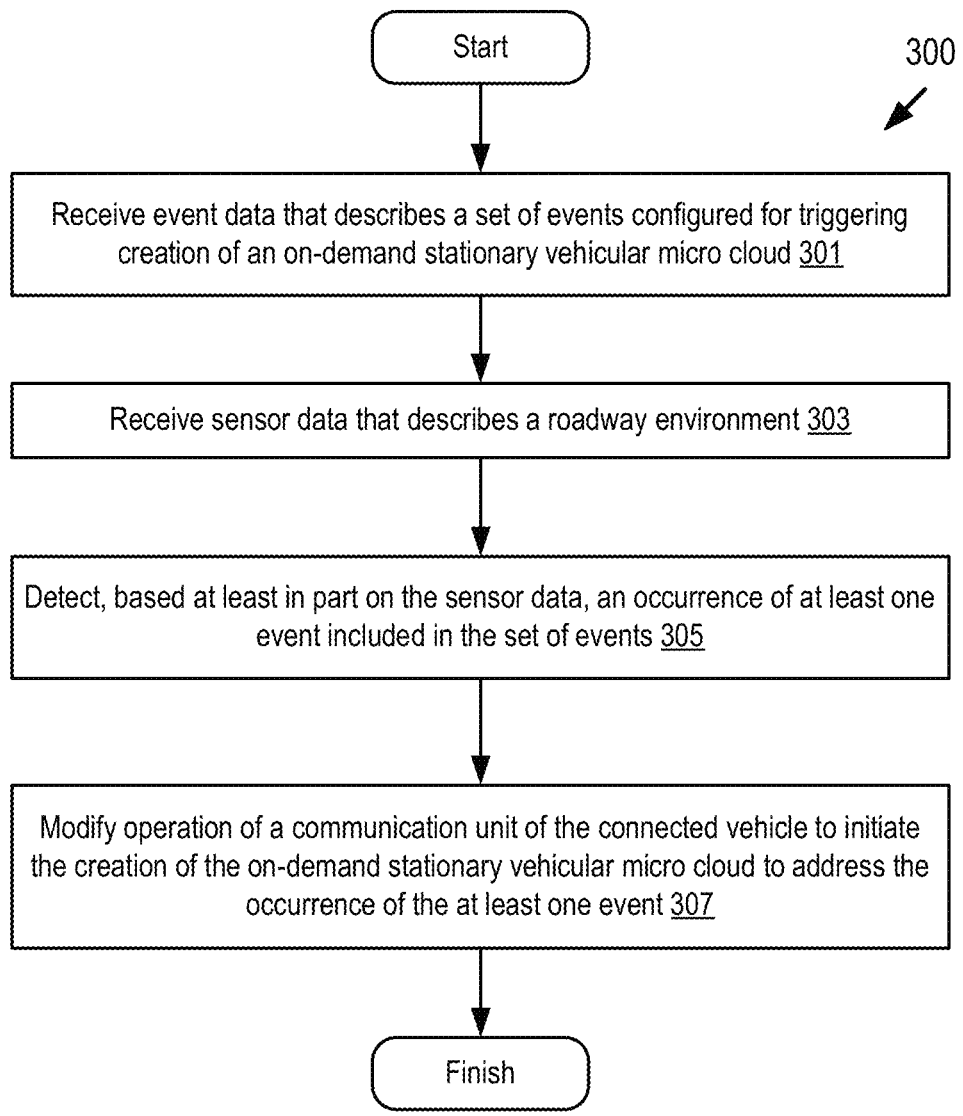
FIG. 3 depicts a method for forming an on-demand stationary vehicular micro cloud according to some embodiments.

Referring now to FIG. 3, depicted is a flowchart of an example method 300 for forming an on-demand stationary vehicular micro cloud according to some embodiments. The steps of the method 300 are executable in any order, and not necessarily the order depicted in FIG. 3. Here, assume that the method 300 is performed by a connected vehicle.

At step 301, the event detector system 195 receives event data that describes a set of events configured for triggering a creation of an on-demand stationary vehicular micro cloud.

At step 303, the event detector system 195 receives sensor data that describes a roadway environment.

At step 305, the event detector system 195 detects, based at least in part on the sensor data, an occurrence of at least one event included in the set of events.

At step 307, the vehicular cloud manager system 193 modifies an operation of the communication unit 145 of the connected vehicle to initiate the creation of the on-demand stationary vehicular micro cloud to address the occurrence of the at least one event.

Figure 4A:
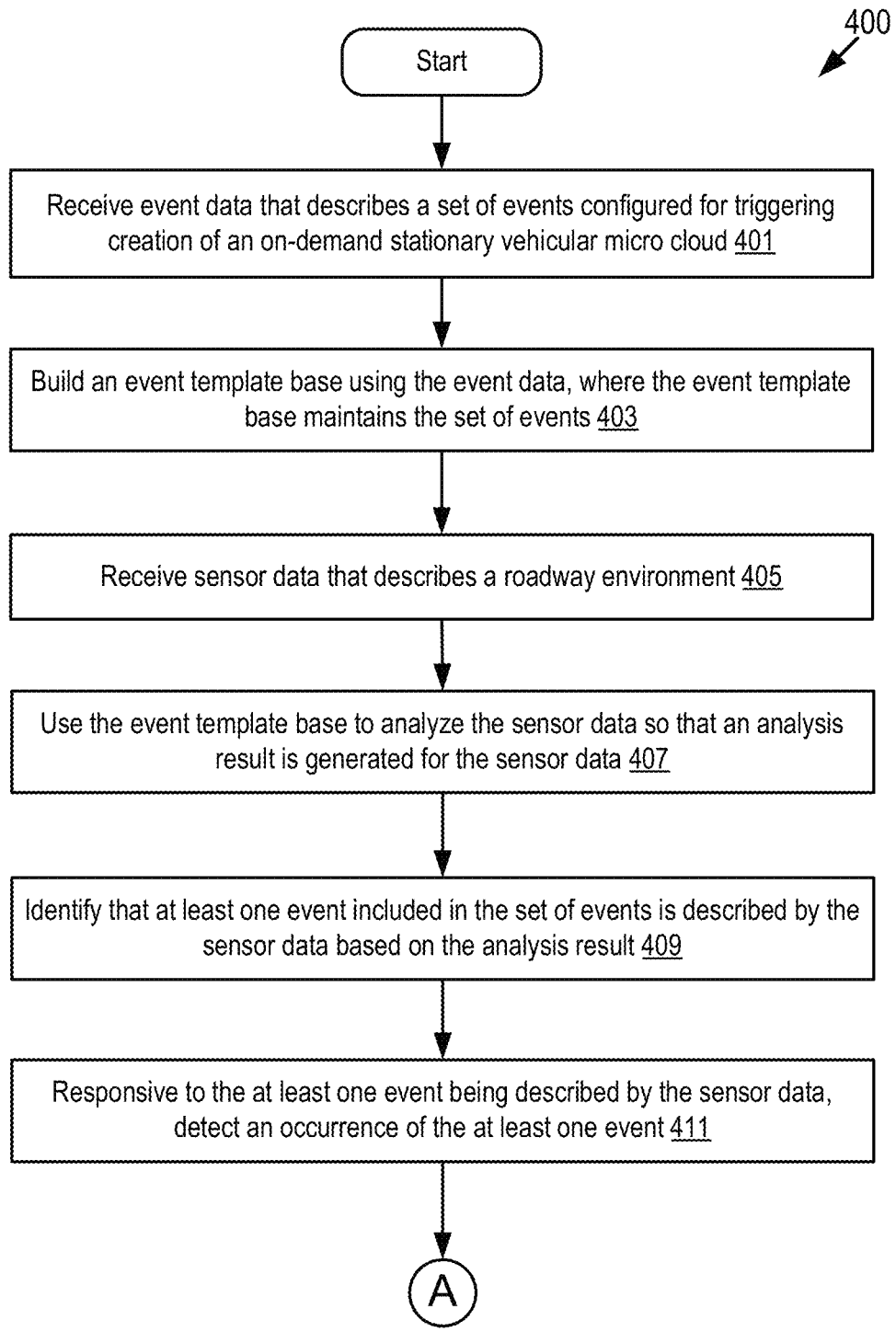
FIGS. 4A-4B depict another method for forming an on-demand stationary vehicular micro cloud according to some embodiments.
Figure 4B:
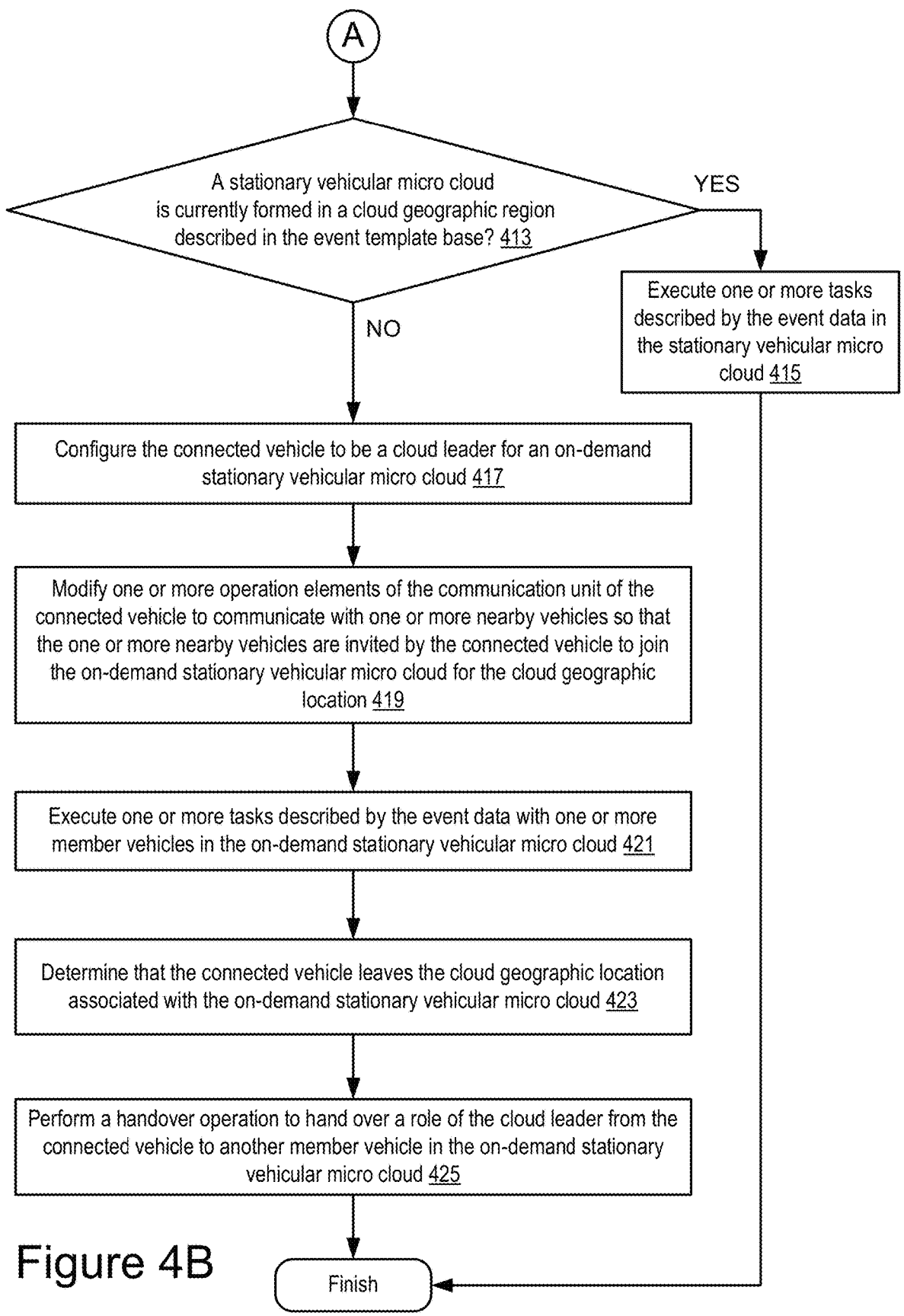

FIGS. 4A-4B depict another method 400 for forming an on-demand stationary vehicular micro cloud according to some embodiments. The steps of the method 400 are executable in any order, and not necessarily the order depicted in FIGS. 4A-4B. Here, assume that the method 400 is performed by a connected vehicle.

Referring to FIG. 4A, at step 401, the event detector system 195 receives event data that describes a set of events configured for triggering a creation of an on-demand stationary vehicular micro cloud.

At step 403, the event detector system 195 builds an event template base using the event data, where the event template base maintains the set of events.

At step 405, the event detector system 195 receives sensor data that describes a roadway environment.

At step 407, the event detector system 195 uses the event template base to analyze the sensor data so that an analysis result is generated for the sensor data.

At step 409, the event detector system 195 identifies that at least one event included in the set of events is described by the sensor data based on the analysis result.

At step 411, responsive to the at least one event being described by the sensor data, the event detector system 195 detects an occurrence of the at least one event.

Referring to FIG. 4B, at step 413, the vehicular cloud manager system 193 determines whether a stationary vehicular micro cloud is currently formed in a cloud geographic region described in the event template base. Responsive to a stationary vehicular micro cloud being currently formed in the cloud geographic region, the method 400 moves to step 415. Otherwise, the method 400 moves to step 417.

At step 415, the vehicular cloud manager system 193 executes one or more tasks described by the event data with one or more member vehicles in the stationary vehicular micro cloud. Then, the method 400 ends.

At step 417, the vehicular cloud manager system 193 configures the connected vehicle to be a cloud leader for an on-demand stationary vehicular micro cloud.

At step 419, the vehicular cloud manager system 193 modifies one or more operation elements of the communication unit 145 of the connected vehicle to communicate with one or more nearby vehicles so that the one or more nearby vehicles are invited by the connected vehicle to join the on-demand stationary vehicular micro cloud for the cloud geographic region.

At step 421, the vehicular cloud manager system 193 executes one or more tasks described by the event data with one or more member vehicles in the on-demand stationary vehicular micro cloud.

At step 423, the vehicular cloud manager system 193 determines that the connected vehicle leaves the cloud geographic region associated with the on-demand stationary vehicular micro cloud.

At step 425, the vehicular cloud manager system 193 performs a handover operation to hand over a role of the cloud leader from the connected vehicle to another member vehicle in the on-demand stationary vehicular micro cloud.

Figure 5:
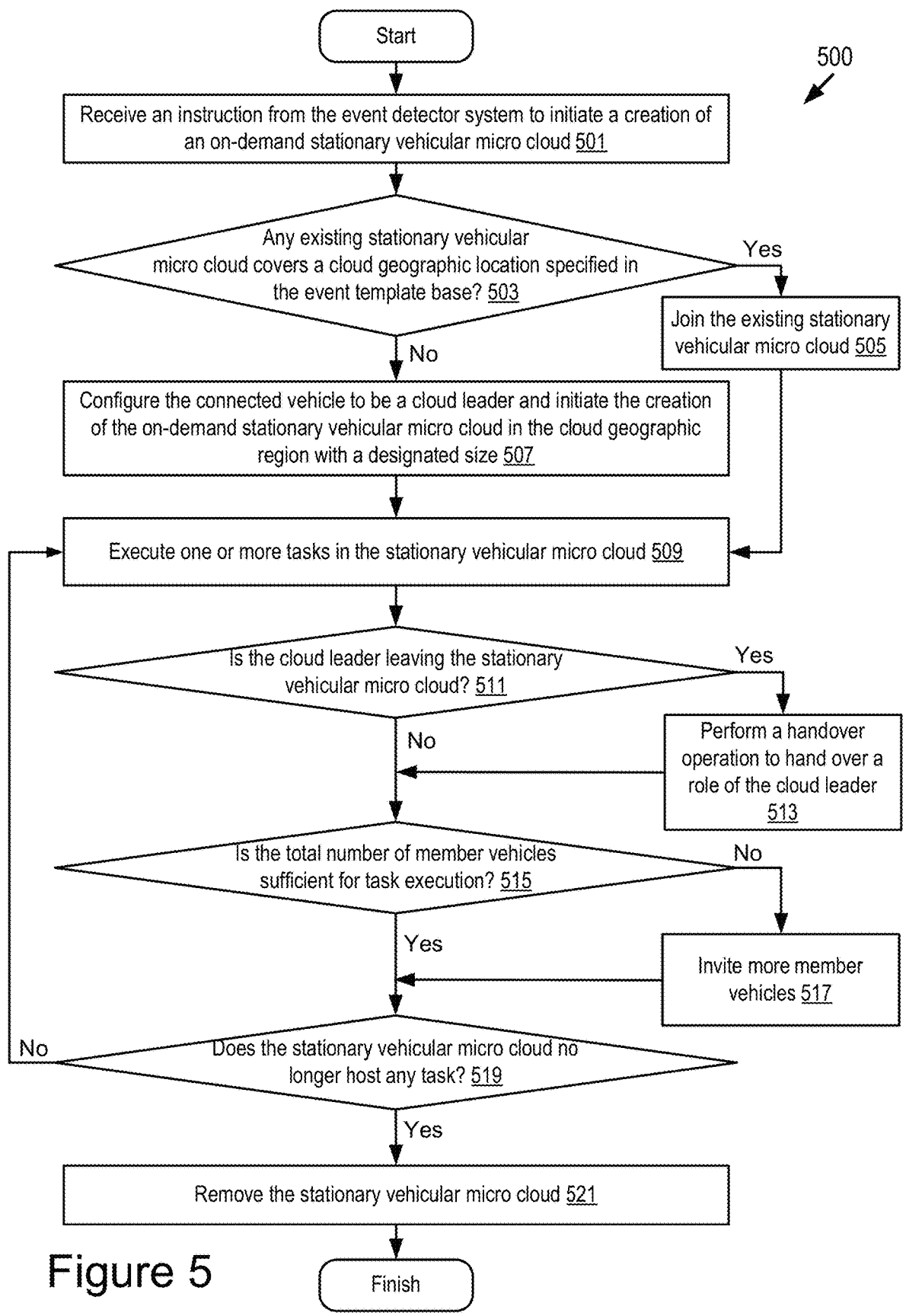
FIG. 5 depicts yet another method for forming an on-demand stationary vehicular micro cloud according to some embodiments.

FIG. 5 depicts yet another method 500 for forming an on-demand stationary vehicular micro cloud according to some embodiments. The steps of the method 500 are executable in any order, and not necessarily the order depicted in FIG. 5. Here, assume that the method 500 is performed by a connected vehicle.

At step 501, the vehicular cloud manager system 193 receives an instruction from the event detector system 195 to initiate a creation of an on-demand stationary vehicular micro cloud.

At step 503, the vehicular cloud manager system 193 determines whether any existing stationary vehicular micro cloud covers a cloud geographic region specified in the event template base. If there is an existing stationary vehicular micro cloud that covers the cloud geographic region, the method 500 moves to step 505. Otherwise, the method 500 moves to step 507.

At step 505, the vehicular cloud manager system 193 joins the existing stationary vehicular micro cloud. Then, the method 500 moves to step 509.

At step 507, the vehicular cloud manager system 193 configures the connected vehicle to be a cloud leader and initiates the creation of the on-demand stationary vehicular micro cloud in the cloud geographic region.

At step 509, the vehicular cloud manager system 193 executes one or more tasks with other members in the stationary vehicular micro cloud. Here, the stationary vehicular micro cloud can be either the existing stationary vehicular micro cloud identified at step 503 or the on-demand stationary vehicular micro cloud created at step 507. In some embodiments, the task execution ends when a certain condition is met. For example, execution of the one or more tasks ends when a pre-defined time period has elapsed since the last detection of the occurrence of the event by members in the stationary vehicular micro cloud.

At step 511, the vehicular cloud manager system 193 determines whether the cloud leader is leaving the stationary vehicular micro cloud. Responsive to the cloud leader leaving the stationary vehicular micro cloud, the method 500 moves to step 513. Otherwise, the method 500 moves to step 515.

At step 513, the vehicular cloud manager system 193 of the cloud leader performs a handover operation to hand over a role of the cloud leader to another member in the stationary vehicular micro cloud. Then, the method 500 moves to step 515.

At step 515, the vehicular cloud manager system 193 of the cloud leader determines whether the total number of member vehicles in the stationary vehicular micro cloud is sufficient for task execution. Responsive to the total number of member vehicles being sufficient for task execution, the method 500 moves to step 519. Otherwise, the method moves to step 517.

At step 517, the vehicular cloud manager system 193 of the cloud leader invites more member vehicles to join the stationary vehicular micro cloud. Then the method 500 moves to step 519.

At step 519, the vehicular cloud manager system 193 of the cloud leader determines whether the stationary vehicular micro cloud no longer hosts any task. If the stationary vehicular micro cloud does not host any task any more, then the method 500 moves to step 521. Otherwise, the method 500 moves back to step 509.

At step 521, the vehicular cloud manager system 193 of the cloud leader removes the stationary vehicular micro cloud.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
    receiving event data that describes a set of events configured for triggering a creation of an on-demand stationary vehicular micro cloud;
    detecting an occurrence of at least one event included in the set of events in a roadway environment;
    determining that the occurrence occurred at a location where computing resources are needed to complete a task;
    initiating the creation of the on-demand stationary vehicular micro cloud utilizing unused computing resources of one or more connected vehicles to provide the computing resources at the location; and
    dissolving the on-demand stationary vehicular micro cloud responsive to determining that the computing resources are no longer needed because completion of the task.

2. The method of claim 1, further comprising:
    building an event template base using the event data, wherein the event template base maintains the set of events.

3. The method of claim 2, further comprising receiving sensor data that describes the roadway environment and wherein detecting the occurrence of the at least one event comprises:
    using the event template base to analyze the sensor data so that an analysis result is generated for the sensor data;
    identifying that the at least one event is described by the sensor data based on the analysis result; and
    responsive to the at least one event being described by the sensor data, detecting the occurrence of the at least one event.

4. The method of claim 2, wherein the event template base includes one or more of: a cloud geographic region where the on-demand stationary vehicular micro cloud is formed; one or more resource requirements of the on-demand stationary vehicular micro cloud; or one or more tasks to be executed in the on-demand stationary vehicular micro cloud.

5. The method of claim 4, wherein a cloud geographic region is different from an event geographic region where the at least one event occurs.

6. The method of claim 4, wherein a cloud geographic region is identical to an event geographic region where the at least one event occurs.

7. The method of claim 1, wherein a cloud leader invites one or more nearby vehicles to join the on-demand stationary vehicular micro cloud for a cloud geographic region.

8. The method of claim 1, further comprising modifying one or more operation elements of a receiver, transceiver, antenna, or port of the vehicle to communicate with one or more nearby vehicles, wherein the one or more operation elements include one or more of the following: one or more active Vehicle-to-Everything (V2X) channels; one or more active V2X radios; one or more active V2X antennas; one or more operating frequencies of the one or more active V2X channels; one or more beamforming techniques performed on the one or more active V2X antennas; or a bandwidth allocation scheme.

9. The method of claim 1, further comprising:
responsive to the other vehicle leaving a cloud geographic region associated with the on-demand stationary vehicular micro cloud,
performing a handover operation to hand over a role of a cloud leader from the other vehicle to the vehicle in the on-demand stationary vehicular micro cloud.

10. The method of claim 1, further comprising:
executing one or more tasks described by the event data with one or more members in the on-demand stationary vehicular micro cloud.

11. The method of claim 1, wherein the set of events includes one or more of: a lane closure; a traffic accident; a traffic jam; presence of available parking space; or
presence of a crowd of people.

12. A system comprising:
a processor of a vehicle; and
a non-transitory memory storing computer code which, when executed by the processor, causes the processor to:
receive event data that describes a set of events configured for triggering a creation of an on-demand stationary vehicular micro cloud;
detect an occurrence of at least one event included in the set of events in a roadway environment;
determine that the occurrence occurred at a location where computing resources are needed to complete a task;
modify an operation of a receiver, transceiver, antenna, or port of the vehicle to initiate the creation of the on-demand stationary vehicular micro cloud utilizing unused computing resources of one or more connected vehicles to provide the computing resources at the location; and
dissolve the on-demand stationary vehicular micro cloud responsive to determining that the computing resources are no longer needed because completion of the task.

13. The system of claim 12, wherein the computer code, when executed by the processor, causes the processor further to:
build an event template base using the event data, wherein the event template base maintains the set of events.

14. The system of claim 13, wherein the computer code, when executed by the processor, causes the processor to receive sensor data that describes the roadway environment and detect, based at least in part on the sensor data, the occurrence of the at least one event at least by:
using the event template base to analyze the sensor data so that an analysis result is generated for the sensor data;
identifying that the at least one event is described by the sensor data based on the analysis result; and
responsive to the at least one event being described by the sensor data, detecting the occurrence of the at least one event.

15. The system of claim 13, wherein the event template base includes one or more of: a cloud geographic region where the on-demand stationary vehicular micro cloud is formed; one or more resource requirements of the on-demand stationary vehicular micro cloud; or one or more tasks to be executed in the on-demand stationary vehicular micro cloud.

16. The system of claim 15, wherein the cloud geographic region is different from an event geographic region where the at least one event occurs.

17. The system of claim 15, wherein the cloud geographic region is identical to an event geographic region where the at least one event occurs.

18. The system of claim 12, wherein a cloud leader invites one or more nearby vehicles to join the on-demand stationary vehicular micro cloud for a cloud geographic region.

19. A computer program product comprising a non-transitory memory storing computer-executable code that, when executed by a processor of a vehicle, causes the processor to:
receive event data that describes a set of events configured for triggering a creation of an on-demand stationary vehicular micro cloud;
detect an occurrence of at least one event included in the set of events in a roadway environment;
determine that the occurrence occurred at a location where computing resources are needed to complete a task;
initiate the creation of the on-demand stationary vehicular micro cloud utilizing unused computing resources of one or more connected vehicles to provide the computing resources at the location; and
dissolve the on-demand stationary vehicular micro cloud responsive determining that the computing resources are no longer needed because completion of the task.

20. The computer program product of claim 19, wherein the computer-executable code, when executed by the processor, causes the processor further to:
build an event template base using the event data, wherein the event template base maintains the set of events.

* * * * *